Sept. 16, 1930.  E. C. AUSTIN  1,775,841
SPRING GOVERNOR
Filed Jan. 11, 1927
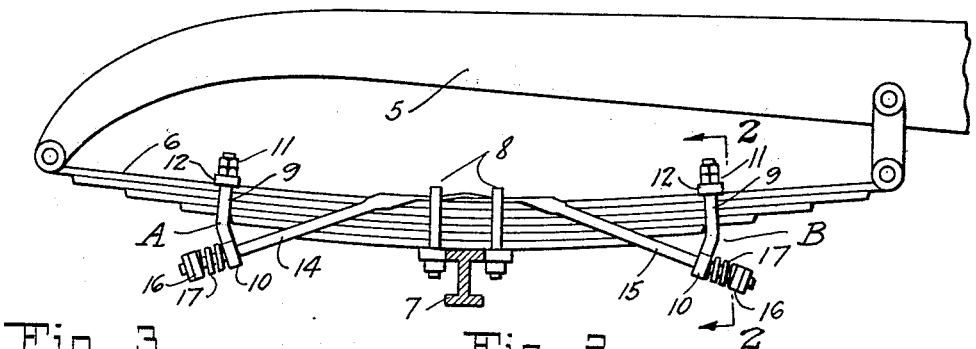
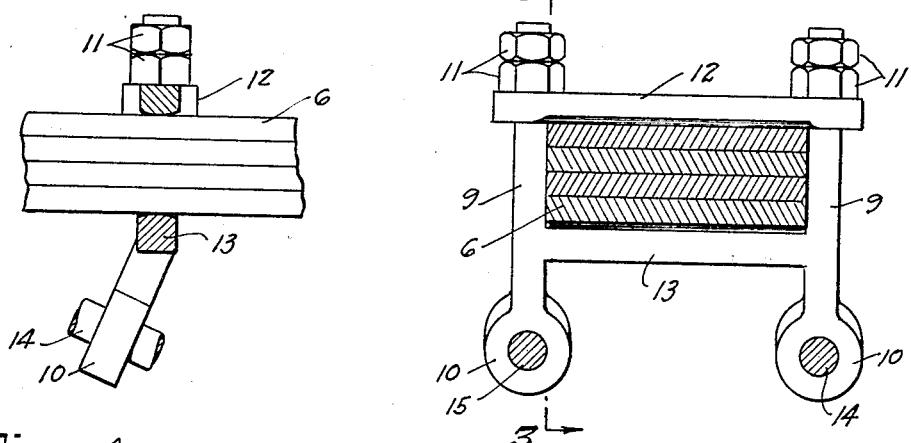
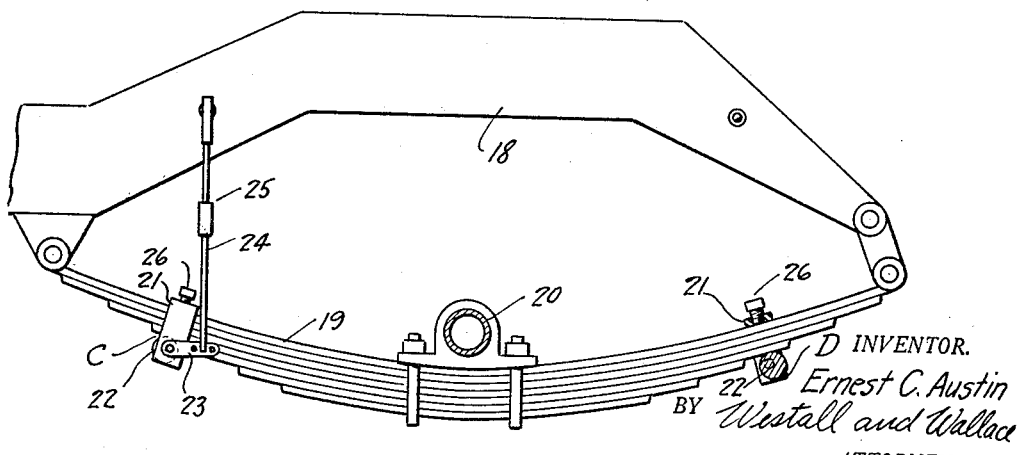
INVENTOR.
Ernest C. Austin
BY Westall and Wallace
ATTORNEYS.

Patented Sept. 16, 1930

1,775,841

UNITED STATES PATENT OFFICE

ERNEST C. AUSTIN, OF LOS ANGELES, CALIFORNIA

SPRING GOVERNOR

Application filed January 11, 1927. Serial No. 160,336.

This invention relates to a device for use with springs formed of a plurality of leaves. The invention may be applied in any instance where it is desired to support a load upon springs, and is particularly adapted to vehicles of all kinds, but more especially to automobiles. The present invention appertains to means for damping the action of springs by reason of increased weight being applied or by reason of a suddenly applied load tending to produce a deflection of relatively great amplitude.

It is the primary object of this invention to provide a device which acts upon the leaves of a spring to press them together in yielding frictional contact and to vary the pressure in correspondence directly with the amplitude of flexure, so as to check the action of the spring as the flexure is increased and to prevent the sudden reaction or rebound of the load.

These objects together with other objects and corresponding accomplishments are obtained by means of the embodiment of my invention illustrated in the accompanying drawing, in which:

Fig. 1 is a side elevation showing a fragment of an automobile frame constituting the load supported by a semi-elliptic spring resting upon an axle shown in section; Fig. 2 is a section as seen on the line 2—2 of Fig. 1 on an enlarged scale; Fig. 3 is a section as seen on the line 3—3 of Fig. 2 showing a fragment of the spring; and Fig. 4 is a side view of a frame of an automobile, a semi-elliptic spring and a modified form of my invention.

Referring more particularly to Figs. 1, 2, and 3 a portion of the frame of an automobile is indicated by 5. Secured thereto in the usual manner is a semi-elliptic leaf spring 6. This is the usual and common automobile construction, an axle is indicated by 7 and is attached to the spring by means of clips 8.

Disposed between the axle and the end of the spring is a clamp 9. The particular clamp shown in Figs. 1, 2, and 3 is of H shape having the lower leg ending in eyes 10, the leg being bent at an angle. The upper end of the legs are threaded to receive nuts 11. Extending across the top of the spring is a bar 12 opposed to and arranged to co-operate with the middle bar 13 of the clamp. The clamp is disposed over the leaves of the spring to embrace and hug the same, the side legs serving the usual function of spring clips to prevent lateral displacement of the leaves and the bar 13 resting against the end of a leaf. The bar 12 may be adjusted so that pressure may be exerted to hold the leaves of the spring together in yielding frictional contact. Obviously the clamp being fulcrumed upon the spring by canting or tilting the clamp upon the spring, the pressure between the leaves may be varied. A feature of this invention is to vary this pressure in correspondence with the flexure of the spring. To this end I have shown in Fig. 1, tie rods or stays. There is a clamp at one end of the spring indicated by A and a similar clamp at the other end of the spring indicated by B. A stay 14 extends through one of the eyes in clamp A, is passed upwardly and across the top to the other side of the spring; thence downwardly and through an eye in clamp B. The stay is bent and flattened at the top, passing under the clips 8 so as to seat on the spring. A similar tie rod 15 extends between the other eyes in the clamps A and B. The tie rods cross one another upon the top of the spring. On the ends of the tie rods are nuts 16 and between the nuts and the eyes are compression springs 17. The nuts provide for adjustment and the spring for resilient connection of the stays to the clamps.

Upon the spring moving downwardly, due to a load, the leaves tend to straighten and the rods bend swinging about a fulcrum at the center of the spring. The axis of pivotal movement of the tie rods is different from that of the springs with the result that upon flexure of the springs, there is a differential movement in a longitudinal direction, causing the stays to pull upon the clamps and cant the latter. The amount of tilting or canting of the clamps is dependent upon the flexure of the springs, The result is that the greater the amount of flexure, the greater the clamping action tending to bind the leaves together. This results in a stiffening of the springs toward the end of the amplitude of their movement. This will prevent the springs from bending sufficiently to allow the frame to strike the buffers on the axle which are usually provided. At the beginning of the bending of the spring, it has great resiliency so that light loads will be taken care of while heavy loads will not cause too great a flexure of the springs. It is obvious that the rebound is damped and checked, the action being the reverse. It will be noted that the stays hold the clamps in position from moving outwardly on the springs.

Whereas I have shown in Figs. 1, 2 and 3 a particular clamp structure and a particular means to vary the clamping pressure, yet other means may be employed. Another embodiment of the invention is shown in Fig. 4, wherein an automobile frame is indicated by 18 and a semi-elliptic spring by 19. The axle 20 is seated above the spring, and clamps C and D of the same construction are disposed over the leaves. Each clamp comprises a yoke 21 straddling the spring with a roller mounted on trunnions between the legs of the yoke and below the spring. This roller indicated by 22 is journaled upon an axis which is eccentric to the periphery of the rollers. Secured to one of the trunnions is an arm 23 to which is secured a connecting rod or stay 24 affixed to the frame, 18. The parts are so arranged that upon flexure of the spring, the stay 24 will swing the arm 23 and cause the roller 22 to turn and tighten against the leaves proportionate to the flexure of the spring. In order to provide for adjustment, a turnbuckle 25 is provided. The clamps are held in position on the spring by means of set screws 26. Various other changes may be made in the structure without departing from the invention.

What I claim is:

1. In combination with a vehicle spring comprising a plurality of leaves, a clamp having members to embrace and hug certain of said leaves whereby to exert a compressive force for resisting relative longitudinal movement of said leaves, and a stay extending longitudinally of said spring and supported to have a differential longitudinal movement with relation thereto, said stay being connected to said clamp to operate the latter in correspondence with the flexure of said spring to progressively vary said force.

2. In combination with a vehicle spring comprising a plurality of leaves, a clamp having opposed members to embrace and hug certain of said leaves, said clamp being fulcrumed on said spring whereby to be turned to vary the compressive force exerted between said leaves, and a stay extending longitudinally of said spring and supported to have a differential longitudinal movement with relation thereto, said stay being connected to said clamp to operate the latter in correspondence with the flexure of said spring to progressively vary said force.

3. In combination with a vehicle spring comprising a plurality of leaves, a clamp having members to embrace and hug certain of said leaves whereby to exert a compressive force for resisting relative longitudinal movement of said leaves, and a stay extending longitudinally of said spring and secured thereto at one end and to said clamp at the other end to have a differential longitudinal movement with relation to said spring in correspondence with the flexure of said spring whereby to progressively vary said force.

4. In combination with a vehicle spring comprising a plurality of leaves, a clamp having opposed members to embrace and hug certain of said leaves, said clamp being fulcrumed on said spring whereby to be turned and to vary the compressive force exerted between said leaves, and a stay extending longitudinally of said spring and secured thereto at one end and to said clamp at the other end to have a differential longitudinal movement with relation to said spring in correspondence with the flexure of said spring whereby to progressively vary said force.

5. In combination with a semi-elliptic spring comprising a plurality of leaves, clamps on opposite sides of the spring support, said clamps engaging certain of said leaves and exerting compressive forces for resisting relative longitudinal movement of said leaves, and stays extending longitudinally of said spring and tying said clamps together so as to have a differential longitudinal movement with respect to said spring in correspondence with the flexure thereof and to correspondingly vary said forces.

6. In combination with a semi-elliptic spring comprising a plurality of leaves, clamps on opposite sides of the spring support, each clamp having members to embrace and hug certain of said leaves whereby to exert a compressive force for resisting relative longitudinal movement of said leaves, and stays extending longitudinally of said spring and tying said clamps together so as to have a differential longitudinal movement with respect to said spring in correspondence with the flexure thereof and to correspondingly vary said force.

7. In combination with a semi-elliptic spring comprising a plurality of leaves, clamps on opposite sides of the spring support, each clamp having opposed members to embrace and hug certain of said leaves and fulcrumed on said spring whereby to be turned and to vary the compressive force exerted between said leaves, and stays extending longitudinally of said spring and tying said clamps together so as to have a differential longitudinal movement with respect to said spring in correspondence with the flexure thereof and to correspondingly turn said clamp to vary said forces.

In witness that I claim the foregoing I have hereunto subscribed my name.

ERNEST C. AUSTIN.